Jan. 12, 1932.                    H. SEIDMAN ET AL                    1,840,681
                                      LINK DEVICE
                                  Filed March 21, 1930
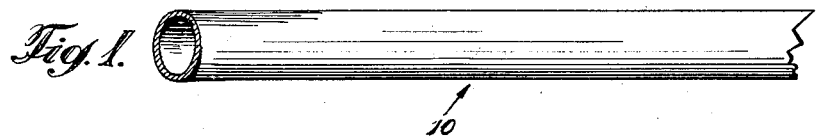
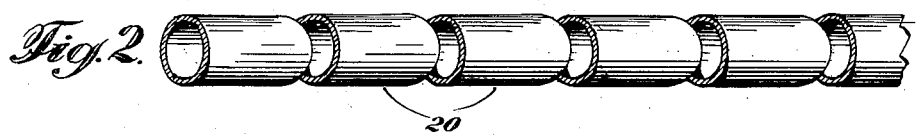
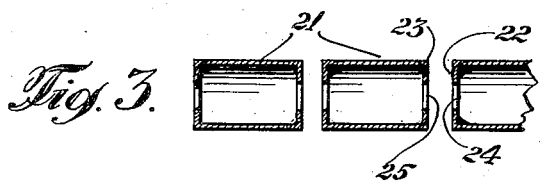
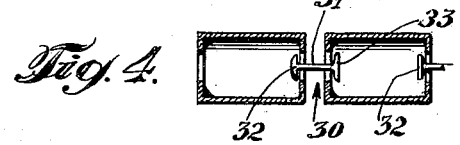
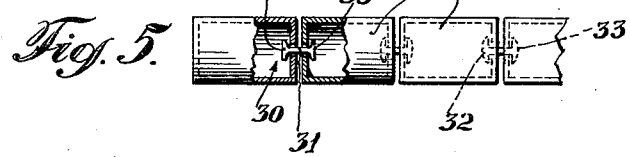
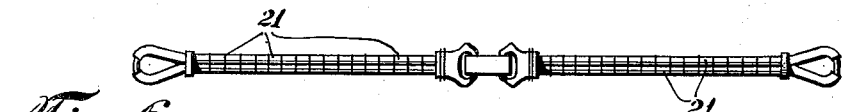
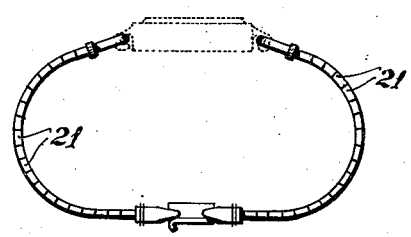
INVENTORS
Hyman Seidman and
Henry Cohan
BY
Edward M. Craft
their ATTORNEY Patented Jan. 12, 1932

1,840,681

UNITED STATES PATENT OFFICE

HYMAN SEIDMAN AND HENRY COHAN, OF BROOKLYN, NEW YORK, ASSIGNORS TO SEIDMAN & COHAN, INC., OF NEW YORK, N. Y., A CORPORATION OF NEW YORK

LINK DEVICE

Application filed March 21, 1930. Serial No. 437,781.

Our present invention relates to articulated or link structures, such as chains, also bracelets for holding wrist watches and the like, and aims to devise articles of the general character specified which are mechanically well suited for the purposes for which they are intended to be used, which are simple in construction, which may be easily and economically fabricated and assembled, and which are very neat and attractive in appearance. Other objects and advantages of the devices of the present invention, particularly as exemplified in the following illustrative embodiment of the same, will readily occur to those skilled in the art to which the present invention relates.

In the accompanying specification we shall describe, and in the annexed drawings more or less diagrammatically exemplify, an illustrative embodiment of the present invention. It is, however, to be clearly understood that our invention is not limited to the specific embodiment thereof herein shown and described for purposes of illustration only.

Referring to the drawings, in which we have more or less diagrammatically exemplified the aforesaid illustrative embodiment of the present invention:

Fig. 1 is a perspective view of a tube from which the substantially tubular link members of the present invention may readily be fabricated;

Fig. 2 is a similar view of a plurality of tubular sections made from the tubular member illustrated in Fig. 1 of the drawings and adapted to serve as blanks for the substantially tubular link members forming a part of the aforesaid illustrative embodiment of the present invention;

Fig. 3 is a sectional view of substantially tubular link members in partially formed condition in accordance with the principles of the present invention;

Fig. 4 is a similar view of a series of the partially formed link members shown in Fig. 3 of the drawings assembled with relation to the connecting members but before the ends of the substantially tubular link members have been closed in substantially final position over the ends of the connecting members;

Fig. 5 is a partial side, partial longitudinal sectional view of the assembled substantially tubular link members and associated connecting members with the ends of the members closed in final position over the ends of the connecting members;

Fig. 6 is a plan view of the completed bracelet or wrist watch strap in final condition and constituting the aforesaid illustrative embodiment of the present invention; and Fig. 7 is an edge view of a completed wrist watch strap associated with a wrist watch.

Referring now to the aforesaid illustrative embodiment of the present invention, and with particular reference to the drawings illustrating the same, 10 indicates generally the tubular member illustrated in Fig. 1 of the drawings and comprising a substantially cylindrical member of substantially annular or circular cross section, the outer diameter of which is generally a small fraction of an inch and the inner diameter of which is an even smaller fraction of an inch. The tubular member 10 is generally made of gold, white gold, platinum or other precious metal, although, of course, it may be made of any other noble or base metal.

We may cut or sever by any suitable means the tube 10 into a series of tubular sections or members 20 of any desired length, generally a moderate fraction of an inch, having the same internal and external diameters as those of the tube from which such sections were originally made. We may now, by any suitable metal-working operation, partially close the ends of the tubular members 20 to form the substantially tubular partially formed link members generally designated by reference character 21 in Fig. 3 of the drawings where the end portions 22 and 23 are provided with the substantially centrally disposed perforations 24 and 25, respectively, which perforations, however, are left large enough initially to permit the free entrance and withdrawal of the ends of the connecting members subsequently described in considerable detail herein.

In order to connect the partially formed substantially tubular link members 21, we may utilize any suitable means, preferably the connecting members 30 more clearly shown in Figs. 4 and 5 of the drawings where it will be seen that each of the connecting members 30 preferably comprises an intermediate member 31 of relatively small cross sectional area and a plurality, here shown as two, end members 32 and 33 which are at the respective ends of the intermediate member 31 and which are of relatively larger cross sectional areas. Preferably the end portions 32 and 33 are of disk-like form, although they may be of globular form so that the connecting members 30 may have the general form of a "dumbbell".

We now assemble a series of the partially formed substantially tubular link members 21 by passing one end of a connecting member 30 through the appropriate perforation, whether 24 in the end portion 22 or 25 in the end portion 23, the perforations 24 and 25 being left sufficiently large in the partially formed condition of the substantially tubular link members 21 to permit the passage therefrom of the ends 32 and 33 of the connecting members 30.

Once the link member has been assembled properly with respect to the appropriate connecting member, the end portions 22 or 23, or both, as the case may be, are properly finished so as to close up the appropriate perforations 24 and 25, to leave just enough room for the intermediate member 31 to rotate or otherwise move freely around therein, but without leaving enough room for the end portions 32 and 33 to be withdrawn from such perforations.

The articulated structure thus obtained and illustrated in detail in Fig. 5 of the drawings, may now be utilized in any suitable length or lengths for building up a chain, a bracelet or a wrist watch strap, such as the wrist watch strap shown in Figs. 6 and 7 of the drawings. This completes the description of the construction and mode of assembly of the aforesaid illustrative embodiment of the present invention.

The advantages of such construction are numerous and of great practical importance. The device is simple in construction and may be readily and conveniently fabricated and assembled. Due to its simplicity, it is relatively inexpensive while at the same time providing a very neat and attractive chain, wrist watch strap, bracelet or other article.

Other superiorities and advantages of the device of the present invention, particularly as exemplified in the aforesaid illustrative embodiments of the same, will readily occur to those skilled in the art to which the present invention relates.

What we claim as our invention is:

1. As an article of manufacture, a link member for articulated structures, such as bracelets and the like, comprising a substantially tubular member of general cylindrical form having end portions formed integrally with said tubular member and closing the same at right angles thereto, said end portions being substantially centrally perforated.

2. As an article of manufacture, an articulated structure, such as a bracelet for watches and the like, including a plurality of closely adjacent link members each comprising a substantially circular substantially tubular member of general substantially circular cylindrical form having closed substantially circular end portions at right angles to the cylindrical member which are substantially centrally perforated, in combination with a series of connecting members connecting said substantially tubular link members, each of said connecting members comprising an intermediate member of relatively small cross-sectional area, and a plurality of end members of relatively large cross-sectional areas, said intermediate member passing into a pair of consecutive tubular members through the perforations in opposed end portions of the same and said end members lying beyond said end portions within said tubular members, said end members being of substantially larger diameter than the diameter of said perforations.

3. As an article of manufacture, a chain, bracelet and the like, comprising a pair of articulated members, each including a plurality of closely adjacent links, each of said links consisting of a cylindrical member having centrally perforated closed end portions formed integrally with and at right angles to the cylindrical member, and a series of connecting members, one intermediate each pair of said links in engagement with the perforated closed end portions of successive links, and means attached to said articulated members for carrying a watch, pendant and the like.

In testimony whereof, we have signed our names to this specification this 15th day of March, 1930.

HYMAN SEIDMAN.
HENRY COHAN.